(12) United States Patent
Yeung et al.

(10) Patent No.: US 7,506,801 B2
(45) Date of Patent: Mar. 24, 2009

(54) DOCUMENT AUDIT TRAIL SYSTEM AND METHOD

(75) Inventors: Mike Yeung, Mission Viejo, CA (US); Amir Shahindoust, Laguna Niguel, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 673 days.

(21) Appl. No.: 11/100,707

(22) Filed: Apr. 7, 2005

(65) Prior Publication Data

US 2006/0226212 A1 Oct. 12, 2006

(51) Int. Cl.
*G06F 17/00* (2006.01)
(52) U.S. Cl. ...................................... 235/375
(58) Field of Classification Search ................... 235/375
See application file for complete search history.

(56) References Cited

U.S. PATENT DOCUMENTS

| | | | |
|---|---|---|---|
| 5,923,763 A | 7/1999 | Walker et al. | |
| 6,043,819 A | 3/2000 | LeBrun et al. | |
| 6,263,438 B1 | 7/2001 | Walker et al. | |
| 6,370,521 B1 | 4/2002 | Pigos, Jr. et al. | |
| 6,694,043 B2 | 2/2004 | Seder et al. | |
| 6,728,000 B1 | 4/2004 | Lapstun et al. | |
| 6,744,906 B2 | 6/2004 | Rhoads et al. | |
| 6,813,385 B2 | 11/2004 | Ideyama | |
| 6,823,075 B2 | 11/2004 | Perry | |
| 6,826,688 B1 | 11/2004 | Westerman et al. | |
| 2002/0144021 A1 | 10/2002 | Pigos, Jr et al. | |
| 2002/0176598 A1 | 11/2002 | Knowles et al. | |
| 2003/0020957 A1 | 1/2003 | Brewster | |
| 2003/0028494 A1* | 2/2003 | King et al. | 705/71 |
| 2003/0231785 A1 | 12/2003 | Rhoads et al. | |
| 2004/0080777 A1 | 4/2004 | Smith | |
| 2004/0128555 A1 | 7/2004 | Saitoh et al. | |
| 2004/0150859 A1 | 8/2004 | Hayashi | |
| 2004/0169892 A1 | 9/2004 | Yoda | |
| 2004/0174556 A1 | 9/2004 | Lapstun et al. | |
| 2004/0179237 A1 | 9/2004 | Takenaka et al. | |
| 2004/0257625 A1 | 12/2004 | Tonami | |
| 2004/0263911 A1 | 12/2004 | Rodriguez et al. | |
| 2005/0007632 A1 | 1/2005 | Miyazaki et al. | |

* cited by examiner

*Primary Examiner*—Steven S Paik
*Assistant Examiner*—Tae W Kim
(74) *Attorney, Agent, or Firm*—Tucker Ellis & West LLP

(57) ABSTRACT

This invention is directed to a document audit trail system and method for tracking and auditing document processing operations performed on and distribution of an electronic document. This invention allows information relating to the source of an electronic document, whether the document is an original, document processing operations performed on the document, distribution of the document, and other historical characteristics be extracted from indicia applied to the document.

14 Claims, 4 Drawing Sheets

DOCUMENT AUDIT TRAIL SYSTEM AND METHOD

BACKGROUND OF THE INVENTION

This invention is directed to a document audit trail system and method. More particularly, this invention is directed to a system and method for tracking and auditing document processing operations performed on and distribution of an electronic document.

Document processing systems or devices allow users to generate electronic documents, generate printouts or reproductions, or perform other document processing operations on such electronic or hard-copy documents. These documents are then printed or electronically stored in a storage medium or distributed to other users, devices, or systems. In the event a question or concern arises regarding the document, such as the source of the document, if the document is an original, or the document processing operations performed on the document, there is not currently any method to retrieve such information from the document itself. If the document was distributed via a third party, such as via a telecommunications company for facsimile transmission of a document, then limited information about the document may be able to obtained from such third party. However, gathering such information requires determining the party which has the information and then following the appropriate procedure to obtain the information, which may be quite time consuming and at some expense. It would be desirable if information about the source of the document as well as other historical information could be extracted directly from the document.

This invention overcomes the aforementioned problems and provides a system and method for tracking and auditing document processing operations performed on and distribution of an electronic document.

SUMMARY OF THE INVENTION

In accordance with present invention, there is provided a document audit trail system and method for tracking and auditing document processing operations performed on and distribution of an electronic document.

Further, in accordance with the present invention, there is provided a system and method for extracting source information, document processing operation information, and other historical information regarding an electronic document directly from the document itself.

Still further, in accordance with the present invention, there is provided a document audit trail system. The system comprises data communication means, wherein the data communication means include document data input means adapted for receiving document data representative of historical characteristics of an associated document. The system also comprises conversion means adapted for converting between document data and indicia data representative of a visual representation of an encoding thereof. The data communication means also includes means adapted for communicating the indicia data with an associated document processing device.

In a preferred embodiment, the data communication means includes means adapted for communicating data with at least one of a printing device, scanning device, copying device, facsimile machine, multifunctional peripheral, and client application.

In another embodiment, the system further comprises means adapted for receiving a document processing instruction representative of a user-specified document processing operation for the associated document. In this embodiment, the system also comprises means adapted for generating document data in accordance with a received document processing instruction and means adapted for applying indicia, inclusive of encoded information relating to the user-specified document processing operation, to the associated document in accordance with indicia data received from the conversion means. Preferably, the indicia is applied to the document in the form of a barcode.

More preferably, the system further comprises means adapted for generating data by sensing a property of the indicia in accordance with generated document data and means adapted for generating a signal representative of a history of documents processing operations performed on the associated document in accordance with the generation of the document data.

Preferably, the historical characteristics include at least one of user name, document processing device identification, document identification, document processing instructions associated with the document, and size of the document.

In one embodiment, the document data input means includes an associated document processing device, which document processing device includes means adapted for decoding the indicia on the associated document so as to generate the document data therefrom.

Still further, in accordance with the present invention, there is provided a document audit trail method. The method comprises the steps of receiving document data representative of historical characteristics of an associated document, and converting between document data and indicia data representative of a visual representation of an encoding thereof. The method also comprises the step of communicating the indicia data with an associated document processing device.

In a preferred embodiment, at least one of the steps of receiving the document data and communicating the indicia data is with at least one of a printing device, scanning device, copying device, facsimile machine, multifunctional peripheral, and client application.

In another embodiment, the method further comprises the steps of receiving a document processing instruction representative of a user-specified document processing operation for the associated document, generating document data in accordance with a received document processing instruction. The method also comprises the step of applying an indicia, inclusive of encoded information relating to the user-specified document processing operation, to the associated document in accordance with indicia data received from the conversion means. Preferably, the indicium is applied to the document in the form of a barcode.

More preferably, the method also comprises the steps of generating data by sensing a property of the indicia in accordance with generated document data and generating a signal representative of a history of documents processing operations performed on the associated document in accordance with the generation of the document data.

Preferably, the historical characteristics include at least one of user name, document processing device identification, document identification, document processing instructions associated with the document, and size of the document.

In one embodiment, the method further comprises the step of decoding the indicia on the associated document, via an associated document processing device, so as to generate the document data therefrom.

Still other advantages, aspects and features of the present invention will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The subject invention is described with reference to certain parts, and arrangements to parts, which are evidenced in conjunction with the associated drawings, which form a part hereof and not, for the purposes of limiting the same in which.

DETAILED DESCRIPTION OF THE INVENTION

This invention is directed to a document audit trail system and method for tracking and auditing document processing operations performed on and distribution of an electronic document. This invention allows information relating to the source of an electronic document, whether the document is an original, document processing operations performed on the document, distribution of the document, and other historical characteristics be extracted from indicia applied to the document.

Figure 1:
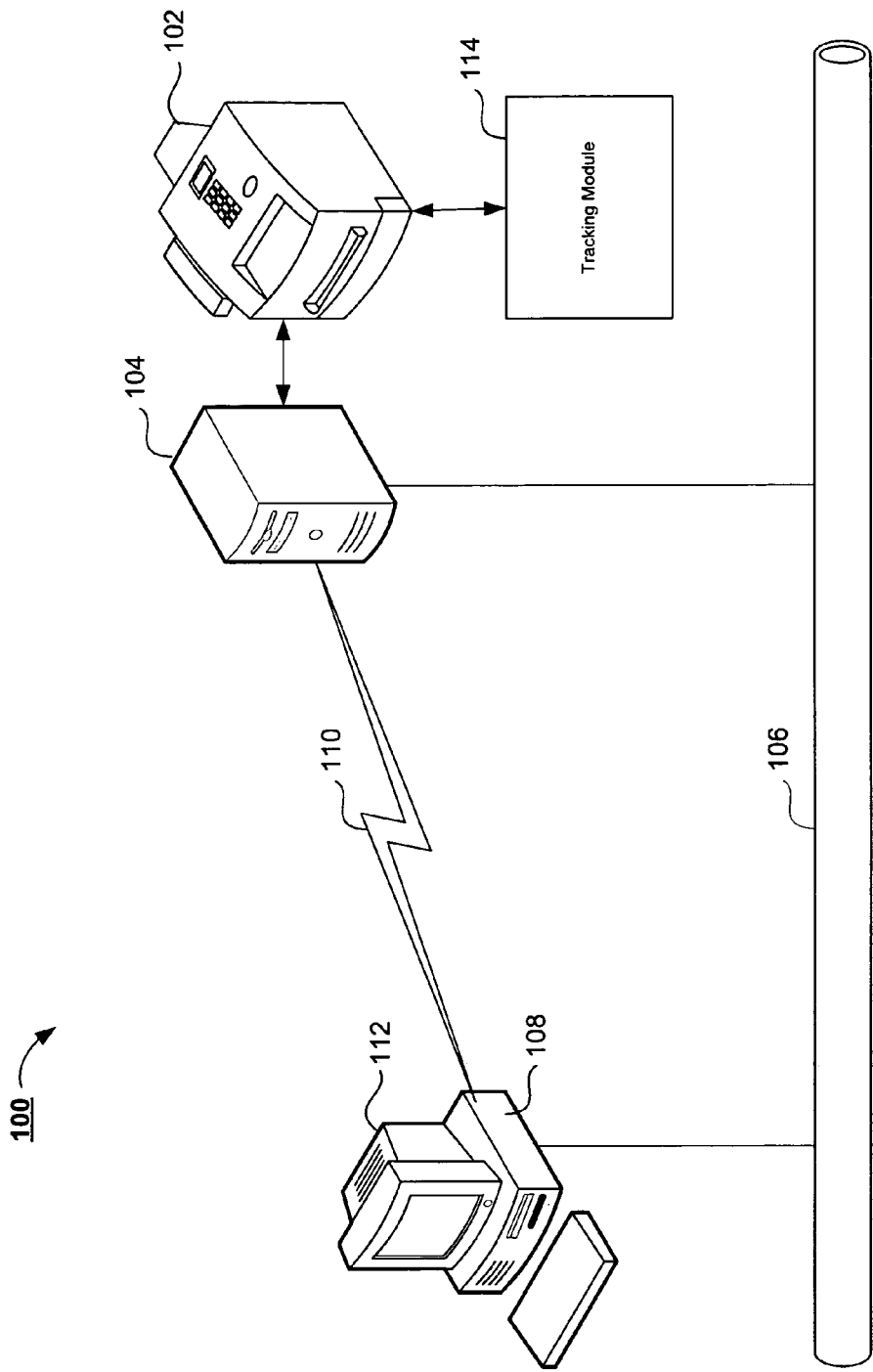
FIG. 1 is a block diagram illustrative of the system of the present invention.

FIG. 1 illustrates a block diagram preferred embodiment of the system according to the present invention generally designated as 100. The system comprises at least one document processing device, as illustrated by multifunction peripheral device 102, for generating or processing image data. It is to be appreciated that the document processing device 102 is any suitable document processing device known in the art, such as a printer, copying device, scanning device, facsimile, multifunctional peripheral device, and the like, or any combination thereof. Suitable commercially available document processing devices include, but are not limited to, the Toshiba e-Studio Series Controller.

The document processing device 102 of the system 100 further comprises a controller 104, which controls the functions of the document processing device 102 as will be appreciated by one of ordinary skill in the art. The controller 104 is capable of being externally or internally coupled to the multifunctional peripheral device 102. The controller 104 is advantageously any hardware, software, or combination thereof suitably capable of controlling the functioning of the document processing device 102 as will be appreciated by one of ordinary skill in the art.

Preferably, the document processing device 102 is communicatively coupled to a computer network 106. The computer network 106 includes at least one computer, workstations, wireless devices, or other suitable user device 108 which enables the user to communicate and use the capabilities of the document processing device 102. It is understood that the computer network 106 may suitably comprise additional computers, workstations, wireless devices, or other suitable device by which the user is able to communicate with and use the capabilities of the document processing device 102.

The network 106 is suitably any suitable network known in the art, for example and without limitation a transmission system such Ethernet, Token Ring, or wireless connection, and is suitably incorporated over a local area network, a wide area network, or a common network such as the Internet. The user device 108 transmits data to the document processing device 102 through the controller 104 over the computer network 106.

The user device 108 communicates with the controller 104 of the document processing device 102 via a suitable communications link 110. As will be understood by those skilled in the art, the communications link 110 is any means for communication between two electronic devices, for example and without limitation, 802.x, an Ethernet based network, infrared connection, Wi-Fi connection, telephone connection, cellular telephone connection, Bluetooth connection, and the like. The skilled artisan will appreciate that the communications link 110 is capable of being implemented over a computer network 106 or by directly connecting the user device 108 to the controller 104 of the multifunctional peripheral device 102.

Preferably, the user device 108 includes an associated user interface 112 by which an associated user requests document processing operations and selects the parameters associated therewith. The user interface 112 preferably includes a display means for displaying information related to document processing operations. It will be appreciated that viable user interfaces suitably take various forms, such as touch screen, keypads, pen input, and the like.

It will be appreciated by those skilled in the art that the document processing device 102 need not be coupled to the computer network 106, but rather is also suitably in a stand-alone mode. In such embodiment, the document processing device includes an associated user interface (not shown). The user interface suitably comprises a touch-screen or other input/output device capable of displaying and receiving user instructions for the operation of the multifunctional peripheral device 102. The skilled artisan will understand that such a stand-alone configuration will not affect the operation of the present invention with respect thereto.

In the preferred embodiment, the document processing device is also in data communication with a tracking module 114 to generating the indicia or tracking data to be applied to the document and decoding the indicia or tracking data applied or associated with the document. The tracking module 114 is capable of being externally or internally coupled to the document processing device.

Figure 2:
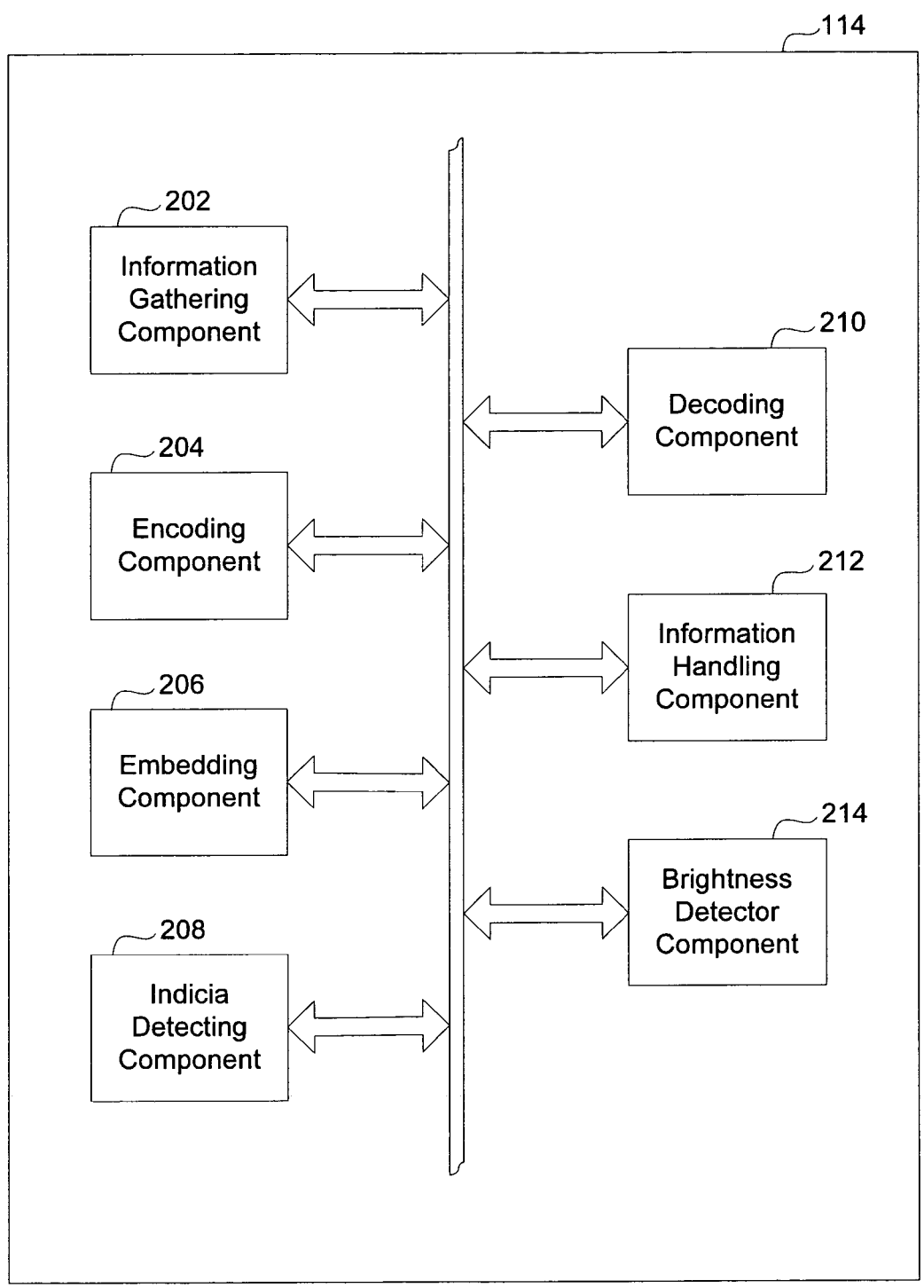
FIG. 2 is a block diagram illustrative of the tracking module or functionality for generating the indicia outracking data and decoding the indicia or tracking data of the present invention.

The tracking module 114 preferably includes several components as shown in FIG. 2. The tracking module includes an information gathering component 202 which collects predefined information or tracking data about the document via any suitable means known in the art. In one embodiment, information or tracking data associated with a document is transmitted with the document data when a document processing operation is requested for such document. In another embodiment, the information or tracking data is generated by the document processing device when performing document processing operations and then transmitted to the tracking module. The information or tracking data to be collected preferably includes at least one of user name, document processing device identification, document identification, document processing instructions associated with the document, and size of the document. The document processing instructions associated with the document, include, but are not limited to, the type of document processing operation performed, the number of times document processing operations have been performed, distribution of the document, and the like. The information selected to be collected is determined by any suitable means. For example, in one embodiment, a system administrator or other authorized user sets the parameters for the information collection as will be appreciated by one skilled in the art. In another embodiment, a user suitably selects the parameters for the information to be collected for the user's documents.

The tracking module also includes an encoding component 204 which encodes the information or tracking data collected by the information gathering module. The encoding component encodes the information via any suitable means. Preferably, the encoding component encodes the information in the form of a two dimensional barcode. Suitable two dimensional barcodes include, but are not limited to, Indicia, PDF417, QR Code, Supercode, and the like.

The tracking module further includes an embedding component 206, which embeds or applies the encoded tracking data or indicia into the associated document via any means known in the art. In a preferred embodiment, the encoded tracking data or indicia is transmitted to the document processing device and associated with the document data such that the indicia are generated as part of the document during the document processing operation.

An indicia detecting component 208 is also included in the tracking module. The indicia detecting module determines if indicia or encoded tracking data is present in a selected document as will be appreciated by one skilled in the art. Preferably, if tracking data is to be generated for a document, header information is generated indicating that tracking data is associated with the document and appended to the document data. Preferably, the indicia detecting component determines if indicia is present by detecting the presence of such header information. In the event that the document is in a tangible form, indicia suitably formed from a bar code, such as a two-dimensional or three-dimensional bar code as will be appreciated by one of ordinary skill in the art. If such indicia or encoded tracking data is present, such data is suitably separated from the rest of the document data for decoding.

The decoding component 210 then decodes the indicia or encoded tracking data by any means known in the art. Preferably, the decoding is performed by the scanning functionality of the document processing device or special decoding software or devices known in the art. Once the indicia or encoded tracking data is decoded, the decoded data is transmitted to the information handling component 212 for processing. Preferably, a report is generated containing selected tracking information and provided to the administrator or user in a suitable medium, such as an electronic mail message, via an Internet web page displayed on the administrator computer, or by a hard copy generated by an associated document processing device.

The tracking module further comprises a brightness detector component 214 for detecting the brightness level of the indicia via any suitable means. The brightness of the indicia indicates if the document being decoded is an original or a copy.

Figure 3:
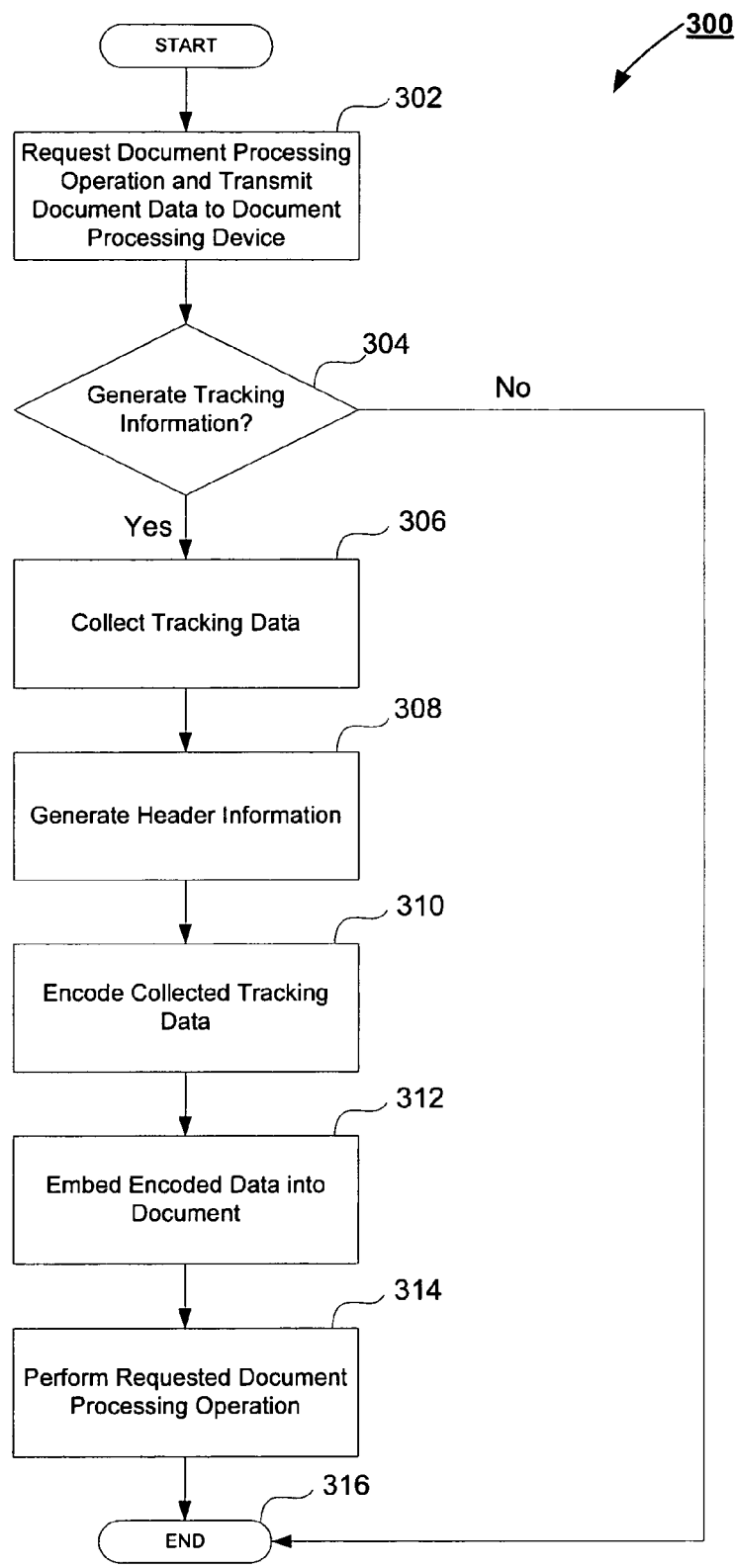
FIG. 3 is a flowchart illustrating the process of generating the indicia or tracking data according to the present invention.

FIG. 3 is a flowchart 300 illustrating the process for generating indicia or tracking data according to the present invention. At 302, a user requests a document processing operation to be performed on a document and document data is transmitted to the document processing device for processing as discussed above. Flow proceeds to 304 wherein a determination is made whether tracking information is to be generated for such document processing request. In one embodiment, such determination is made in accordance with the parameters set by the system administrator. In another embodiment, the user selects by suitable means whether tracking data should be generated. If tracking data is not to be generated flow proceeds to 316 and the process ends.

If tracking data is to be generated, then flow proceeds to 306 wherein tracking data is collected by suitable means. Preferably, the tracking data is collected via the information gathering component as discussed above. Once the tracking data has been collected, flow proceeds to 308 wherein header information is generated indicating that tracking data is associated with the document and the header information is appended to the document data via any suitable means.

At 310, the collected tracking data is encoded as will be appreciated by one of ordinary skill in the art. Preferably, the collected tracking data is encoded via the encoding component as discussed above. At 312, the encoded tracking data or indicia is suitably embedded, inserted, or applied, preferably by the embedding component, into the document. In a preferred embodiment, the encoded tracking data or indicia is transmitted to the document processing device and associated with the document data such that the indicia generated as part of the document during the document processing operation. At 314, the requested document processing operation is performed.

Figure 4:
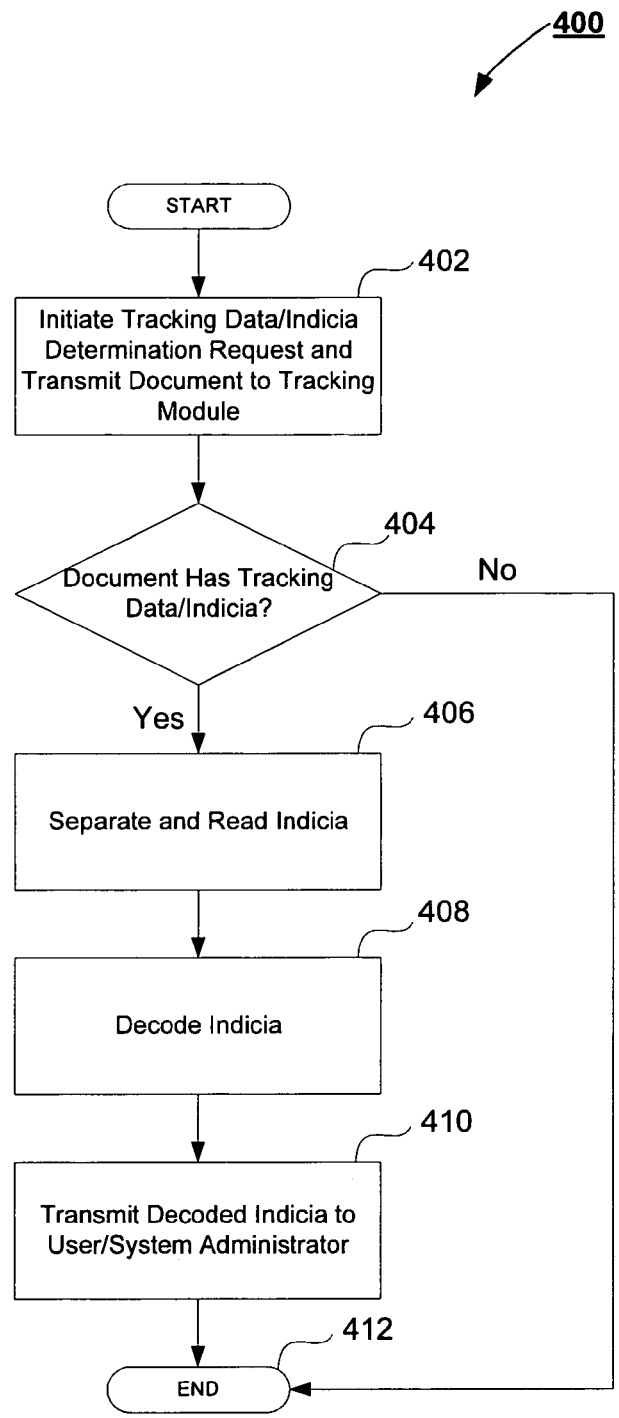
FIG. 4 is a flowchart illustrating the process for decoding the indicia or tracking data according to the present invention.

FIG. 4 is a flowchart 400 illustrating the process for decoding the indicia or encoded tracking data according to the present invention. At 402, a user initiates a request to determine if a document contains indicia or tracking data and the document is transmitted to the tracking module via any suitable means.

At 404, a determination is suitably made whether the document contains indicia or tracking data. Preferably, such determination is made by the indicia detecting component as discussed above. If no indicia is detected, flow proceeds to 412 and the process ends.

In the event indicia is detected, flow proceeds to 406 wherein the indicia is read by any suitable means. Preferably, if indicia is detected, the indicia is separated from the remaining document data by the indicia detecting component. At 408, the indicia is decoded to obtain the decoded tracking data. In a preferred embodiment, the indicia is decoded via the decoding component as discussed above.

At 410, the decoded tracking data is then transmitted to the system administrator or user. Preferably, the decoded tracking data is transmitted to the information handling component for further processing and then transmitted to the system administrator or user as discussed above.

While in the preferred embodiment the present invention is implemented in software, as those skilled in the art can readily appreciate it may also be implemented in hardware or a combination of software and hardware.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed:

1. A document audit trail system comprising:
   data communication means, the data communication means including document data input means adapted for receiving document data representative of historical characteristics of an associated document, which document includes an indicia;

conversion means adapted for converting between document data and indicia data representative of a visual representation of an encoding thereof;

the data communication means further includes means adapted for communicating the indicia data with an associated document processing device comprising at least one of a printed device, scanning device, copying device, facsimile machine, multifunctional peripheral, and client application;

means adapted for receiving a document processing instruction representative of a user-specified document processing operation for the associated document;

means adapted for generating document data in accordance with a received document processing instruction;

sensing means adapted for sensing a property of an indicia of the associated document, which property includes data corresponding to a history of at least one document processing operation performed on the associated document;

means adapted for generating updated property data in accordance with a sensed property of the indicia in accordance with generated document data;

means adapted for applying a modified indicia, inclusive of encoded information relating to the user-specified document processing operation and updated property data, to the associated document in accordance with indicia data received from the sensing means; and rendering means adapted for generating a tangible document output corresponding to received document data, which tangible document data includes the modified indicia.

2. The document audit trail system of claim 1 wherein the historical characteristics include at least one of user name, document processing device identification, document identification, document processing instructions associated with the document, and size of the document.

3. The document audit trail system of claim 1 wherein the indicia applied to the associated document is in the form of a barcode.

4. The document audit trail system of claim 1 wherein the document data input means includes an associated document processing device, which document processing device includes means adapted for decoding the indicia applied to the associated document so as to generate the document data therefrom.

5. A document audit trail method comprising the steps of:
receiving document data representative of historical characteristics of an associated document, which document includes an indicia;

converting between document data and indicia data representative of a visual representation of an encoding thereof;

communicating the indicia data with an associated document processing device comprising at least one of a printed device, scanning device, copying device, facsimile machine, multifunctional peripheral, and client application;

receiving a document processing instruction representative of a user-specified document processing operation for the associated document;

generating document data in accordance with a received document processing instruction;

sensing a property of an indicia of the associated document, which property includes data corresponding to a history of at least one document processing operation performed on the associated document;

generating updated property data in accordance with a sensed property of the indicia in accordance with generated document data;

applying a modified indicia, inclusive of encoded information relating to the user-specified document processing operation and updated property data, to the associated document in accordance with indicia data received from the sensing; and generating a tangible document output corresponding to received document data, which tangible document data includes the modified indicia.

6. The document audit trail method of claim 5 wherein the historical characteristics include at least one of user name, document processing device identification, document identification, document processing instructions associated with the document, and size of the document.

7. The document audit trail system of claim 5 wherein the indicia applied to the associated document is in the form of a barcode.

8. The document audit trail system of claim 5 further comprising the step of decoding the indicia, via an associated document processing device, on the associated document so as to generate the document data therefrom.

9. A computer-readable medium for auditing a document trail comprising:
instructions for receiving document data representative of historical characteristics of an associated document, which document includes an indicia;

instructions converting between document data and indicia data representative of a visual representation of an encoding thereof;

instructions for communicating the indicia data with an associated document processing device comprising at least one of a printing device, scanning device, copying device, facsimile machine, multifunctional peripheral, and client application;

instructions for receiving a document processing instruction representative of a user-specified document processing operation for the associated document;

instructions for generating document data in accordance with a received document processing instruction;

instructions for sensing a property of an indicia of the associated document, which property includes data corresponding to a history of at least one document processing operation performed on the associated document;

instructions for generating updated property data in accordance with a sensed property of the indicia in accordance with generated document data;

instructions for applying a modified indicia, inclusive of encoded information relating to the user-specified document processing operation and updated property data, to the associated document in accordance with indicia data received from the sensing; and instructions for generating a tangible document output corresponding to received document data, which tangible document data includes the modified indicia.

10. The computer-readable medium for auditing a document trail of claim 9 wherein the historical characteristics include at least one of user name, document processing device identification, document identification, document processing instructions associated with the document, and size of the document.

11. The computer-readable medium for auditing a document trail of claim 9 further comprising instructions for decoding the indicia, via an associated document processing device, on the associated document so as to generate the document data therefrom.

12. A computer-implemented method for auditing a document trail comprising the steps of:

receiving document data representative of historical characteristics of an associated document, which document includes an indicia;

converting between document data and indicia data representative of a visual representation of an encoding thereof;

communicating the indicia data with an associated document processing device comprising at least one of a printing device, scanning device, copying device, facsimile machine, multifunctional peripheral, and client application;

receiving a document processing instruction representative of a user-specified document processing operation for the associated document;

generating document data in accordance with a received document processing instruction;

sensing a property of an indicia of the associated document, which property includes data corresponding to a history of at least one document processing operation performed on the associated document;

generating updated property data in accordance with a sensed property of the indicia in accordance with generated document data;

applying a modified indicia, inclusive of encoded information relating to the user-specified document processing operation and updated property data, to the associated document in accordance with indicia data received from the sensing; and generating a tangible document output corresponding to received document data, which tangible document data includes the modified indicia.

13. The computer-implemented method for auditing a document trail of claim 12 wherein the historical characteristics include at least one of user name, document processing device identification, document identification, document processing instructions associated with the document, and size of the document.

14. The computer-implemented method for auditing a document trail of claim 12 further comprising the step of decoding the indicia, via an associated document processing device, on the associated document so as to generate the document data therefrom.

* * * * *